United States Patent
Shah et al.

(10) Patent No.: US 11,856,965 B2
(45) Date of Patent: Jan. 2, 2024

(54) SOLID FOAM PRODUCTS AND METHODS OF MAKING THE SAME

(71) Applicant: THE HERSHEY COMPANY, Hershey, PA (US)

(72) Inventors: Utkarsh Shah, Hershey, PA (US); Gagan Mongia, Hummelstown, PA (US); Yvette Thibault Pascua Cubides, Palmyra, PA (US)

(73) Assignee: THE HERSHEY COMPANY, Hershey, PA (US)

( * ) Notice: Subject to any disclaimer, the term of this patent is extended or adjusted under 35 U.S.C. 154(b) by 194 days.

(21) Appl. No.: 17/381,454

(22) Filed: Jul. 21, 2021

(65) Prior Publication Data

US 2021/0345637 A1 Nov. 11, 2021

Related U.S. Application Data

(62) Division of application No. 16/079,786, filed as application No. PCT/US2017/018685 on Feb. 21, 2017, now abandoned.

(60) Provisional application No. 62/318,313, filed on Apr. 5, 2016, provisional application No. 62/300,356, filed on Feb. 26, 2016.

(51) Int. Cl.
  *A23G 1/52* (2006.01)
  *A23G 1/56* (2006.01)
  *A23P 30/40* (2016.01)
  *A23L 2/66* (2006.01)

(52) U.S. Cl.
  CPC .................. *A23G 1/52* (2013.01); *A23G 1/56* (2013.01); *A23L 2/66* (2013.01); *A23P 30/40* (2016.08)

(58) Field of Classification Search
  None
  See application file for complete search history.

(56) References Cited

U.S. PATENT DOCUMENTS

| | | | |
|---|---|---|---|
| 3,930,053 A | 12/1975 | Japikse et al. | |
| 3,985,910 A | 10/1976 | Kirkpatrick | |
| 4,303,684 A | 12/1981 | Pitchon et al. | |
| 6,090,401 A | 7/2000 | Gowan, Jr. et al. | |
| 6,207,216 B1 | 3/2001 | Zietlow et al. | |
| 6,565,909 B1 | 5/2003 | Huang et al. | |
| 9,107,445 B2 | 8/2015 | Spelman et al. | |
| 2003/0087017 A1 | 5/2003 | Hanselmann et al. | |
| 2004/0131743 A1 | 7/2004 | Ajao et al. | |
| 2004/0234660 A1 | 11/2004 | Bauman et al. | |
| 2009/0311406 A1 | 12/2009 | Tapfer et al. | |
| 2011/0200732 A1 | 8/2011 | Kielmeyer et al. | |
| 2014/0335255 A1 | 11/2014 | Jung et al. | |
| 2015/0024093 A1 | 1/2015 | Wang | |

FOREIGN PATENT DOCUMENTS

| | | | |
|---|---|---|---|
| CN | 101489416 | | 7/2009 |
| JP | 2013179919 A | * | 9/2013 |
| WO | 2008009618 A2 | | 1/2008 |
| WO | WO-2012089448 A1 | * | 7/2012 ............. A23L 11/05 |

OTHER PUBLICATIONS

Asli Can Karaca et al, Emulsifying properties of chickpea, fababean, lentil and peaproteins produced by isoelectric precipitation and salt extraction; Food Research International 44 (2011) 2742-2750 (Year: 2011).*

The handy Homemeker; "Aquafaba peep meringues—Egg free"; Apr. 20, 2014, 4 pages obtained from Dandelion and dates. (Year: 2014).*

New 3D Sweetener to Reduce Sugar in Your Coffee, PR Newswire, http://www.prnewswire.com/news-releases/new-3d-sweetener-to-reduce . . . ; dated Jan. 23, 2017.

* cited by examiner

*Primary Examiner* — Jyoti Chawla
(74) *Attorney, Agent, or Firm* — McNees Wallace & Nurick LLC

(57) ABSTRACT

An air-stable edible solid foam product includes at least one sweetener. In some embodiments, the air-stable edible solid foam is free of a whipping agent, and the foaming occurs by vacuum expansion. In some embodiments, the air-stable edible foam product includes at least one proteinaceous whipping agent derived from a plant source and the foaming occurs by whipping. A method of enhancing a beverage includes contacting a solid foam beverage enhancer including at least one sweetener and at least one flavoring agent to the beverage and disintegrating the solid foam beverage enhancer in the beverage within a predetermined period of time. Methods of making an air-stable edible solid foam product are also disclosed.

18 Claims, No Drawings

SOLID FOAM PRODUCTS AND METHODS OF MAKING THE SAME

CROSS-REFERENCE TO RELATED APPLICATIONS

This application is a divisional application of co-pending U.S. patent application Ser. No. 16/079,786, which has a 35 U.S.C. 371(c) date of Aug. 24, 2018 and is a national stage filing of PCT/US2017/018685 filed Feb. 21, 2017, which claims priority to and the benefit of U.S. Provisional Application No. 62/300,356 filed Feb. 26, 2016 and U.S. Provisional Application No. 62/318,313 filed Apr. 5, 2016, which are hereby incorporated by reference in their entirety.

FIELD OF THE INVENTION

This application is directed to solid foam products and methods of making the same. More particularly, the present invention is directed to an edible solid foam product, an enhanced beverage, and methods of making the same.

BACKGROUND OF THE INVENTION

A whipping agent promotes the formation and stabilization of a foam. A variety of different molecules may be used as whipping agents for food products, including fats, oils, proteins, and surfactants. Solid foams may be created either by whipping before water removal, drying, and cooking or by foaming after water removal, cooking, and drying. Commercial food products in the form of a foam include whipped cream, marshmallows, and meringue. Butterfat serves as a whipping agent in whipped cream, while gelatin is the typical whipping agent in marshmallows, and the albumin of egg whites usually serves as the whipping agent in meringues. Meringues are an example of a solid foam created by whipping before water removal, cooking, and drying.

Commercially-available foams prepared using one or more non-modified proteinaceous ingredients as the whipping agent are not readily soluble in aqueous liquids, inhibiting their usage as beverage enhancers. Most of the beverage enhancers that are currently commercially available are in the form of either a powder or a syrup. Typically, proteins in their native state are not functional as foaming agents, especially proteins obtained from plants. In order to make a protein functional for its emulsion, solubility, and foaming ability, the protein must typically be chemically altered by enzymes or other another chemical treatment.

Most proteins are known to denature after heating and/or drying. Denaturation reduces their water-solubility, as the hydrophobic groups are exposed by the denaturing. This makes these proteins unsuitable for rapid disintegration in an aqueous medium, even if they might otherwise be used as a whipping agent. The heating and aqueous extraction of certain legumes, however, such as during a canning process, selectively isolates certain water-soluble proteins that remain useful as water-soluble whipping agents.

Aeration and vacuum expansion of hard candy includes processing a candy mass to a specific low moisture content, aerating the candy mass to a desired level, subjecting the aerated candy mass to a high vacuum in a vacuum tube or a vacuum oven chamber, and cooling the vacuum-expanded candy. The edible, soluble solid foam final product contains an altered air cell and bubble structure.

It would be desirable to provide a fast-disintegrating solid foam beverage enhancer having a pleasant flavor to enhance the taste of a beverage using a plant-based protein composition free of enzymatic or chemical modification as the whipping agent.

It would be desirable to provide a fast-disintegrating solid foam beverage enhancer having a pleasant flavor to enhance the taste of a beverage without having a whipping agent.

BRIEF DESCRIPTION OF THE INVENTION

Exemplary embodiments are directed to air-stable, fast-disintegrating solid foams.

Certain exemplary embodiments employ a proteinaceous whipping agent derived from a plant source. Certain exemplary embodiments employ a natural, non-modified protein composition as a whipping agent in a formulation to produce an edible, stable solid foam. A highly functional legume protein composition with foamability is selectively extracted without having to chemically or enzymatically alter the protein at a molecular level.

Certain exemplary embodiments produce an edible, stable solid foam without any whipping agent through a vacuum expansion process.

Among the advantages of certain exemplary embodiments is that addition of the edible, stable solid foam to a beverage results in rapid disintegration of the stable solid foam in the beverage to form an enhanced beverage with an improved taste relative to the unenhanced beverage.

Among the advantages of certain exemplary embodiments is that addition of the edible, stable solid foam to a beverage results in rapid disintegration of the stable solid foam in the beverage to form an enhanced beverage with an enhanced nutritional value relative to the unenhanced beverage. In some embodiments, nutrient delivery is provided either by fortifying the formulation or enclosing a nutrient-dense powder in the center of the foam.

Among the advantages of certain exemplary embodiments is that edible, stable solid foam products are provided that rapidly disintegrate even in cold beverages while also enhancing the beverage by delivering a suitable taste and sweetness.

Other features and advantages of the present invention will be apparent from the following more detailed description of exemplary embodiments that illustrate, by way of example, the principles of the invention.

DETAILED DESCRIPTION OF EXEMPLARY EMBODIMENTS

In an embodiment, a food product includes an air-stable edible solid foam that disintegrates in the presence of an aqueous liquid. The air-stable edible foam includes at least one proteinaceous whipping agent derived from a plant source and at least one sweetener.

In another embodiment, a food product includes an air-stable edible solid foam that disintegrates in the presence of an aqueous liquid. The air-stable edible solid foam includes a sweetener including sugar in an amorphous state and at least one flavoring agent. The air-stable edible solid foam is free of a whipping agent.

In another embodiment, a method of making an air-stable edible solid foam product includes whipping a foamable mixture including at least one proteinaceous whipping agent derived from a plant source, at least one sweetener, and at least one flavoring agent to form a foamed mixture, and baking the foamed mixture to form the air-stable edible solid foam product.

In another embodiment, a method of making an air-stable edible solid foam product includes mixing and heating a composition including a sweetener including sugar, water, and at least one flavoring agent to form an expandable mixture. The method also includes pulling the expandable mixture to incorporate air into the expandable mixture, vacuum expanding the expandable mixture at a temperature above a glass transition temperature of the expandable mixture to form the edible solid foam product, and cooling the air-stable edible solid foam product to below the glass transition temperature and then releasing a vacuum on the edible solid foam product.

In another embodiment, a method of enhancing a beverage includes contacting a solid foam beverage enhancer including at least one sweetener and at least one flavoring agent to the beverage and disintegrating the solid foam beverage enhancer in the beverage within a predetermined period of time.

In some embodiments, a foamable mixture includes a proteinaceous whipping agent derived from a plant source, a sweetener, a flavoring agent, and, optionally, a coloring agent. The whipping agent allows the mixture to be whipped or foamed into a stable solid foam. The sweetener and the flavoring agent provide an improved taste to an enhanced beverage relative to the unenhanced beverage. The optional coloring agent provides the enhanced beverage with a predetermined color after the foam beverage enhancer disintegrates in the beverage.

As used herein, "disintegration" refers to the breakup of the macroscopic structure of a product after contact with an aqueous liquid. In other words, disintegration is complete upon the earlier of when the product has either completely dissolved in the liquid or the original macrostructure has been substantially completely compromised. As such for a solid foam product, disintegration time refers to the amount of time it takes for the solid foam product to become essentially foam-free, as a result of breaking up of the structure into foam-free particles and/or dissolving in the aqueous liquid, after contact with the aqueous liquid.

The whipping agent, the sweetener, the flavoring agent, and the optional coloring agent, when present, are preferably selected to provide a stable foam beverage enhancer that rapidly disintegrates in a liquid water-based beverage. The liquid water-based beverage may have a temperature anywhere in the range of cold (below room temperature down to a freezing temperature) to around room temperature to hot (above room temperature up to a boiling temperature) at the time at which the stable foam beverage enhancer is added to the beverage. In some embodiments, a cold beverage is in the range of about 33° F. to about 50° F. (1° C. to about 10° C.), alternatively about 36° F. to about 45° F. (about 2° C. to about 7° C.), alternatively about 36° F. to about 41° F. (about 3° C. to about 5° C.), or any range or sub-range therebetween. In some embodiments, a room-temperature beverage is in the range of about 60° F. to about 80° F. (about 16° C. to about 27° C.), alternatively about 65° F. to about 75° F. (about 18° C. to about 24° C.), or any range or sub-range therebetween. In some embodiments, a hot beverage is in the range of about 140° F. to about 212° F. (about 60° C. to about 100° C.), alternatively about 149° F. to about 194° F. (about 65° C. to about 90° C.), alternatively about 158° F. to about 176° F. (about 70° C. to about 80° C.), or any range or sub-range therebetween. Liquid water-based beverages for use with a foam beverage enhancer may include, but are not limited to, water, milk, coffee, tea, acid-based beverages, carbonated beverages, non-alcoholic blended beverages, or juices.

Foams are an already diluted system (diluted with a gas) and solid components of the foam become even further diluted upon disintegration in a beverage. As a result, a relatively high concentration of sweetener and flavoring components may be required in the foamable mixture to achieve the desired level of enhancement, particularly for use in cold beverages. A challenge overcome in accordance with exemplary embodiments is providing a stable foam beverage enhancer that provides the components of the foam in sufficient amounts to achieve the desired effect to the enhanced beverage while still being able to form and subsequently maintain a stable foam structure.

In some embodiments, stable, fast disintegrating solid foams consist of a foamable mixture containing only the whipping agent and sucrose. The presence of a coloring agent, a flavoring agent, and/or additional sweeteners may be added to help provide the desired enhancement to the enhanced beverage. However, these ingredients may tend to decrease the quality, stability, and disintegration rate of the produced solid foam and may be formulated for addition separate from the foam. Foams in accordance with exemplary embodiments disintegrate in a target beverage quickly, preferably in about 60 seconds or less, more preferably in about 30 second or less, and preferably leaving behind no residue.

Because the rate of disintegration increases with increasing temperature of the beverage, stable solid foam beverage enhancers disintegrate much more quickly when the target beverage is a hot beverage, such as hot water, coffee, or tea, than when the target beverage is a cold beverage, such as cold water or cold milk. Exemplary embodiments still achieve rapid disintegration even in cold beverages.

In some embodiments, all of the constituents of the beverage enhancer are combined and provided as part of a stable solid foam, with the stable solid foam having at least a predetermined minimum disintegration rate in a target beverage. In other situations, it is not practical to achieve a predetermined minimum disintegration rate with all of the constituents being provided in a stable solid foam. In such embodiments, the predetermined minimum disintegration rate is achieved by leaving at least some or at least a portion of any foam-destabilizing or disintegration-slowing constituents out of the pre-foam mixture.

In such embodiments, the desired remainder of the foam-destabilizing or disintegration-slowing constituents may be added to the target beverage as a separate component or may be provided as a coating on part or all of the stable solid foam. The separate component is preferably either a powder or a liquid but may have an alternative solid form, such as a pill or tablet. The fast-disintegrating stable solid foam and the separate disintegration-slowing constituents may be added at separate times or at the same time to the beverage to achieve at least a predetermined minimum disintegration rate. The components may remain separate or be present in a combined state as a single unit including both the foam and the disintegration-slowing constituents, which may include the coloring agent, the flavoring agent, or both. The predetermined minimum disintegration rate preferably causes the stable solid foam and the separate component, if present, to disintegrate within 60 seconds in the target beverage.

In some embodiments, the stable solid foam has a predetermined shape. In some embodiments, the predetermined shape has a high surface area-to-volume ratio and/or a low density to maximize the disintegration rate of the stable solid foam in the beverage. In some embodiments, the surface of the solid foam is textured, such as with openings or holes, to increase the surface area-to-volume ratio of the solid foam.

In some embodiments, the predetermined shape is provided by placing the foam in a mold prior to baking the foam, such that the stable solid foam takes the shape of the mold. In some embodiments, the predetermined shape is the shape of a product logo, company logo, or the shape of another object associated with the foam product, the beverage, or the company providing the beverage or the solid foam beverage enhancer.

Foam beverage enhancers preferably include ingredient combinations and amounts that include one or more selected proteins derived from a natural source as a whipping agent. The optional flavoring and/or coloring, when present, are preferably also derived from natural sources. In some embodiments, a water-soluble natural flavoring component of a flavor that is typically fat-soluble may be developed and used as the flavoring agent in a water-soluble foam product.

The whipping agent preferably includes an aqueous protein-containing extract of one or more cooked legumes. In some embodiments, the aqueous protein extract is the liquid from commercially canned legumes. In some embodiments, the aqueous protein extract is obtained by rapidly boiling or simmering the legumes in water. The legumes may be soaked in the water prior to heating to reduce the heating time to obtain the aqueous protein extract. The optimal legume-to-water ratio for extraction may depend on the type of legume, how much water is allowed to boil off during extraction, and the desired concentration of the extract. While increasing the relative amount of water increases the yield of extracted proteins, it also leads to a more dilute protein extract, so there is a balance between extraction efficiency and extract concentration in selecting a legume-to-water ratio. When starting with a dry legume, the legume-to-water ratio by weight for protein extraction may be in the range of about 25:75 to about 75:25, alternatively in the range of about 25:75 to about 50:50, alternatively in the range of about 50:50 to about 75:25, or any range or sub-range therebetween. In some embodiments, the legume-to-water ratio and extraction conditions are selected such that the moisture content of the aqueous protein extract by weight is in the range of about 80% to about 99%, alternatively about 85% to about 95%, alternatively about 90% to about 95%, or any range or sub-range therebetween.

While the aqueous protein extract of chickpeas ("aquafaba") was found to produce the most rapidly disintegrating stable solid foams, the aqueous protein extract of other legumes, such as lentils, also produced soluble stable solid foams. Other legumes may also provide an extract that is useful to create foam structures. Other legumes as aqueous protein extract sources may include, but are not limited to, alfalfa, asparagus beans, asparagus peas, baby lima beans, black beans, black-eyed peas, black turtle beans, Boston beans, Boston navy beans, broad beans, Cannellini beans, chili beans, cranberry beans, dwarf beans, Egyptian beans, Egyptian white broad beans, English beans, fava beans, field peas, French green beans, great northern beans, green beans, green and yellow peas, kidney beans, licorice, lima beans, Madagascar beans, Mexican black beans, Mexican red beans, molasses face beans, mung beans, mung peas, mungo beans, navy beans, pea beans, peanuts, Peruvian beans, pinto beans, red beans, red clovers, red eye beans, red kidney beans, rice beans, runner beans, scarlet runner beans, small red beans, snow peas, southern peas, sugar snap peas, soybeans, wax beans, white clovers, white kidney beans, and white pea beans. In some embodiments, a non-legume-based aqueous protein extract may be used as a whipping agent. An aqueous protein extract of potatoes performed well as a whipping agent but the resulting foam did not disintegrate as rapidly as desired in an aqueous beverage.

Samples of aquafaba and a lentil extract were tested to determine their water content, protein content, protein molecular weight (by sodium dodecyl sulfate electrophoresis), and amino acid profile. Aquafaba, as used herein, refers to any aqueous protein extract of chickpeas. The aquafaba sample was about 90.4% water and about 1.62% protein, by weight, whereas the lentil extract sample was about 96.6% water and about 0.95% protein, by weight.

Although the lentil protein extract and the aquafaba both served as good whipping agents and both produced a water-soluble stable solid foam, the lentil foam was observed to disintegrate more slowly than the aquafaba foam in aqueous beverages under the same conditions. Aggregated high-molecular-weight proteins that form due to inter-molecular disulphide bonds after the process of heating may lose their functionality, because their solubility is decreased in aqueous systems. The molecular weight of aquafaba proteins ranged from about 9 kDa to about 74 kDa, which is relatively small for proteins, and the reduced sample showed a similar molecular weight profile to the non-reduced sample. The lentil protein extract showed some high-molecular-weight protein constituents in the non-reduced lentil extract sample that were significantly less prevalent in the reduced lentil extract sample. Without wishing to be bound by theory, these high-molecular-weight protein constituents are likely the result of protein aggregation caused by disulfide bond formation during heating, and the relatively low amounts of these in legume protein extracts may be the reason for the observed foaming ability and water solubility of legume protein extracts, helping to create foams that can be baked and still be soluble in aqueous beverages. Further, the substantial lack of these constituents in aquafaba may be the reason for the observed rapid solubility of aquafaba-based solid foam products in aqueous beverages.

The amino acid composition analysis of the aquafaba sample showed a functional protein extract that was rich in electrically-charged amino acids (arginine, glutamic acid, lysine, and aspartic acid). Heating the legumes in water selectively extracts these proteins high in this class of amino acids, which are functional for foaming and rapid disintegration after the heat treatment. Legumes tend to have proteins that are lower in sulfur-containing amino acids than other sources. Sulfur-containing proteins aggregate upon heating, decrease in their solubility and foaming capacity. For example, meringue made from egg whites is not soluble in water, because the albumin denatures upon baking and forms aggregates due to the high amounts of sulfur-containing amino acids in albumin.

Whipping may be performed by agitation of a whippable composition in an unlimited amount of air. Alternatively, whipping may be performed by injecting a predetermined amount of air in a given amount of a whippable composition.

In some embodiments, the sweetener includes at least one sugar. Sugar is preferably added to provide body and skeleton to the foam. In some embodiments, the sugar is sucrose. Other sweeteners, which may be natural or artificial sweeteners, may optionally alternatively be added or alternatively be added to further increase the sweetness of the enhanced beverage. These other sweeteners may include, but are not limited to, sucralose, stevia, aspartame, saccharin, acesulfame potassium, or combinations thereof. Such sweeteners may include one or more high-intensity sweeteners. These high-intensity sweeteners may include, but are not limited to, saccharin, aspartame, acesulfame potassium, sucralose, neotame, advantame, or combinations thereof.

Coloring agents and flavoring agents may optionally also be incorporated. In some embodiments, the coloring agents and flavoring agents are preferably obtained from natural sources. The flavoring agents are preferably selected to be non-fat based and to have a minimum negative effect on the foam structure.

Foams are preferably formed and then dried in an oven at a low temperature to create stable solid foamed structures and textures. These dried foams, when brought into contact with aqueous liquids, quickly disintegrate in the aqueous liquid to form a drinkable beverage.

The foamable mixture preferably includes a whipping agent and a sweetener in a weight ratio in the range of 55:45 to 70:30, alternatively in the range of 60:40 to 65:35, or alternatively at a ratio of about 70:40 based on the whipping agent being about 90% moisture and about 2% protein, by weight. The ratio may be different if a more concentrated or less concentrated whipping agent is used. The whipping agent is preferably an aqueous protein-containing extract. In some embodiments, the sweetener is a sugar. In some embodiments, the sugar is sucrose. In other embodiments, a quickly-disintegrating material may be used in place of the sugar.

The foamable mixture may also or alternatively include one or more high intensity sweeteners in a total amount in the range of about 0.5 wt % to about 1.5 wt %, alternatively in a total amount in the range of about 1.0 wt % to about 1.2 wt %, alternatively in a total amount of about 1 wt % or more, or alternatively in a total amount of about 1 wt %. In some embodiments, the alternative or additional sweetener is sucralose, stevia, aspartame, saccharin, acesulfame potassium, or a combination of two or more of these.

The foamable mixture may also include one or more flavoring agents in a total amount in the range of about 0.1 wt % to about 3 wt %, alternatively in a total amount in the range of about 2.3 wt % to about 2.7 wt %, alternatively in a total amount of about 2.5 wt % or more, or alternatively in a total amount of about 2.5 wt %.

The foamable mixture may optionally also include one or more coloring agents in a total amount in the range of about 0.5 wt % to about 1.5 wt %, alternatively in a total amount in the range of about 1.0 wt % to about 1.2 wt %, alternatively in a total amount of about 1 wt % or more, or alternatively in a total amount of about 1 wt %. These amounts, however, may vary based on the concentration of the flavoring agent or coloring agent being used, with a desired outcome being an enhanced beverage with a predetermined flavor enhancement or a predetermined color provided by the solid foam product.

As previously discussed, the ability to obtain a stable foam containing such relatively high amounts of sweetener and flavoring, as well as coloring agents, desired to impart an adequate level of enhancement, particularly to cold beverages, was unexpected and surprising.

In some embodiments, no modified proteins or artificially-designed whipping agents are used. In some embodiments, vacuum expansion is used to produce an edible solid foam without a whipping agent. Vacuum expansion provides greater ingredient flexibility in terms of type and amount of flavoring agent and coloring agent, as there is no need to maintain a solid foam from a whipping stage through a baking stage. The vacuum expansion process provides an amorphous sugar structure with increased surface area that disintegrates quickly in a liquid beverage. In some embodiments, a vacuum-expandable composition includes no ingredients other than one or more sweeteners, a small amount of water, one or more coloring agents, and one or more flavoring agents. In some embodiments, an edible solid foam contains no flour, no starch, and no fat beyond any amounts that may be in the coloring agents or the flavoring agents.

In some embodiments, the vacuum expansion process includes the following steps. At least one sweetener is mixed with water and the mixture is heated to a temperature in the range of about 290° F. to about 300° F. (about 143° C. to about 149° C.), alternatively about 295° F. (about 146° C.), preferably in an open kettle. The at least one sweetener preferably includes sucrose and at least one sugar syrup and may also include at least one high-intensity sweetener. Sugar syrups include, but are not limited to, corn syrup, rice syrup, tapioca syrup, potato syrup, and combinations thereof. A coloring agent may be added before or during heating, and a flavoring agent is preferably added during heating. After all of the ingredients have been heated and mixed together, the heating preferably continues until the mixture reaches a predetermined moisture content or consistency. The open kettle allows incorporation of some air and/or water vapor in the mixture during heating.

The liquid mixture is then cooled while optionally worked until a predetermined texture and viscosity is reached where the mixture is still semi-soft and not too sticky. In some embodiments the liquid mixture may be cooled and/or worked on a tempering table having a controlled surface temperature, such as about 160° F. (about 71° C.). Additional air is then preferably incorporated into the mixture, either by hand or with an automated candy puller. In some embodiments, the mixture is pulled for a predetermined amount of pulling time by an automated candy puller. In some embodiments, an amount of pulling is selected to achieve at least a predetermined disintegration rate of the solid foam product in a predetermined beverage. In some embodiments, a predetermined amount of pulling time to achieve at least a predetermined disintegration rate in the solid foam product is in the range of about 10 to about 45 seconds, alternatively about 10 to about 25 seconds, alternatively about 10 to about 20 seconds, alternatively about 15 to about 20 seconds, alternatively about 13 to about 17 seconds, alternatively about 10 seconds, alternatively about 15 seconds, alternatively about 20 seconds, or any value, range, or sub-range therebetween.

The molten mass is then formed into a rope shape and passed through a die chain or drop-rolled to form a predetermined desired shape. In some embodiments, the desired shape is a spherical ball. The spherical balls preferably have a diameter of about half an inch (about 1.3 cm). The spherical balls are directed to a vacuum oven set in the range of about 130° F. to about 190° F. (about 54° C. to about 88° C.), alternatively about 140 to about 170° F. (about 60° C. to about 77° C.), alternatively about 150° F. to about 160° F. (about 66° C. to about 71° C.), alternatively at about 155° F. (about 68° C.), or any value, range, or sub-range therebetween depending on the composition of the spherical balls, for about 10 minutes, at which time a vacuum is applied until a predetermined size or moisture content is achieved, typically after about 10 minutes. The temperature is decreased to below the glass transition temperature, which is typically about 110° F. (about 43° C.), and then the vacuum is slowly released until atmospheric pressure is reached. The resulting edible solid foam has a diameter about twice the diameter and about eight times the volume of the spherical balls prior to vacuum expansion.

In some embodiments, the ingredients for the vacuum-expandable mixture include at least one sweetener in the range of about 85% to about 99% by weight, water in the range of about 0.1% to about 8% by weight, at least one flavoring agent in the range of about 0.5% to about 2% by weight, and optionally at least one coloring agent in the range of 0 to about 5% by weight. In some embodiments, the at least one sweetener includes sucrose in the range of about 48% to about 65% by weight, a second sweetener in the range of about 30% to about 35% by weight, and optionally a high-intensity sweetener in the range of about 0 to about 2% by weight. In some embodiments, the second sweetener is corn syrup. In some embodiments, the high-intensity sweetener is stevia. These amounts, however, may vary based on the concentration of the flavoring agent or coloring agent being used, with a desired outcome being an enhanced beverage with a predetermined flavor enhancement or a predetermined color provided by the solid foam product.

In some embodiments, the ingredients for the vacuum-expandable mixture include at least one sweetener in the range of about 65% to about 90%, alternatively about 75% to about 85%, alternatively about 77% to about 83%, by weight, water in the range of about 5% to about 15%, alternatively about 7% to about 12%, by weight, at least one cocoa in the range of about 5% to about 15%, alternatively about 8% to about 12%, by weight, and optionally chocolate flavoring in the range of 0 to about 5%, alternatively about 1% to about 4%, alternatively about 2% to about 4%, alternatively about 2.5% to about 3.5%, by weight. In some embodiments, the at least one sweetener includes sucrose in the range of about 40% to about 55%, alternatively about 45% to about 55%, alternatively about 47% to about 52%, by weight, a second sweetener in the range of about 25% to about 35%, alternatively about 28% to about 33%, by weight, and optionally a high-intensity sweetener in the range of about 0 to about 2%, alternatively about 0.25% to about 1%, by weight. In some embodiments, the second sweetener is corn syrup or another liquid syrup. In some embodiments, the high-intensity sweetener is stevia. These amounts, however, may vary, with a desired outcome being an enhanced beverage with a predetermined flavor enhancement or a predetermined color provided by the solid foam product.

In some embodiments, the predetermined disintegration rate is achieved by delivering the solid foam beverage enhancer to the beverage without stirring. In some embodiments, stirring or another form of mixing is used to increase the disintegration rate of the solid foam beverage enhancer in the beverage.

In some embodiments, one or more edible solid foam products including at least one proteinaceous whipping agent derived from a plant source are used in combination with one or more edible solid foam product with no whipping agent to enhance a beverage.

The edible solid foam product may have any shape, including, but not limited to, spherical, substantially spherical, oblong, cubical, substantially cubical, rectangular, or irregular. In some embodiments, the shape may be provided in part or in whole by a mold or by removing portions of the edible solid foam product after it is formed. The edible solid foam product preferably has at least one dimension that is about 1 cm (about 0.4 in) or greater, alternatively about 1 cm to about 5 cm (about 0.4 in to about 2 in), alternatively about 1 cm to about 3 cm (about 0.4 in to about 1.2 in), alternatively about 1.5 cm to about 2.5 cm (about 0.6 in to about 1 in), or any value, range, or sub-range therebetween.

Although the edible solid foams have mostly been described as beverage enhancers, such edible solid foams may alternatively be applied to other moisture-containing products and may be ingested in other manners as well. Such alternatives may include, but are not limited to, eating them incorporated as part of a solid food, such as a cookie or a crisp, or eating them by themselves, such as by allowing them to disintegrate in the mouth to provide a sensory pleasure. In some embodiments, the edible solid foams are added to cake batter or cookie batter to add a flavor to the batter before baking. The foam may be added in an amount based on the flavor or color intensity desired. This leads to cookies and cakes with different flavors and colors.

In other embodiments, an oral delivery foam includes an optional whipping agent, a sweetener, an oral agent, an optional flavoring agent, and an optional coloring agent. The oral delivery foam rapidly disintegrates in the mouth to deliver the oral agent to the mouth. The oral agent may be any component desirably delivered to the oral cavity, including, but not limited to, a breath freshener, a dental treatment such as a fluoride composition, or a pharmaceutical drug such as an anesthetic, an antihistamine, or an analgesic.

EXAMPLES

The invention is further described in the context of the following examples which are presented by way of illustration, not of limitation.

In Examples 1-8, the ingredients were added to a commercial mixer (Hobart Corporation, Troy, OH) and then mixed with a spatula to disintegrate the sucrose and coloring agent. The mixture was then whipped in the commercial mixer on speed 3 for about 10 minutes or until stiff peak was reached. The foam was then piped onto a sheet tray lined with parchment paper. The foam was baked on the parchment paper in an oven set at 200° F. (93° C.) until completely dried, generally taking in the range of about 30 minutes to about 2 hours.

Example 1

Example 1 was made by combining 70 g of aquafaba (61% by weight), 40 g of sucrose (35% by weight), 1.2 g sucralose (1% by weight), 1.3 g of vegetable juice liquid color (1% by weight), and 2.9 g natural strawberry flavoring (3% by weight). The aquafaba contained about 90% water and about 2% protein, by weight. The combined ingredients were whipped to form a foam. The foam was piped onto a tray and baked to form a reddish, stable, baked solid foam.

The solid foam was added to 250-mL milk at a refrigerated temperature of about 40° F. to about 32° F. (about 4° C. to about 0° C.). The foam disintegrated quickly to form a strawberry-flavored beverage.

Example 2

Example 2 was made by combining 70 g of aquafaba (61% by weight), 40 g of sucrose (35% by weight), 1.2 g sucralose (1% by weight), 1 g riboflavin phosphate (1% by weight), and 2.9 g natural pineapple flavoring (3% by weight). The aquafaba contained about 90% water and about 2% protein, by weight. The combined ingredients were whipped to form a foam. The foam was piped onto a tray and baked to form a stable, baked solid foam.

The solid foam was added to 250-mL milk at a refrigerated temperature of about 40° F. to about 32° F. (about 4° C. to about 0° C.). The foam disintegrated quickly to form a yellowish, pineapple-flavored beverage.

Example 3

Example 3 was made by combining 70 g of aquafaba (61% by weight), 40 g of sucrose (35% by weight), 1.2 g sucralose (1% by weight), 1.3 g vegetable juice liquid color (1% by weight), and 2.9 g natural mixed berry flavoring (3% by weight). The aquafaba contained about 90% water and about 2% protein, by weight. The combined ingredients were whipped to form a foam. The foam was piped onto a tray and baked to form a stable, baked solid foam.

The solid foam was added to 250-mL milk at a refrigerated temperature of about 40° F. to about 32° F. (about 4° C. to about 0° C.). The foam disintegrated quickly to form a purplish, mixed berry-flavored beverage.

Example 4

Example 4 was made by combining 70 g of aquafaba (61% by weight), 40 g of sucrose (35% by weight), 1.2 g sucralose (1% by weight), coloring agent, and 2.9 g natural blood orange flavoring (3% by weight). The aquafaba contained about 90% water and about 2% protein, by weight. The combined ingredients were whipped to form a foam. The foam was piped onto a tray and baked to form a stable, baked solid foam.

The solid foam was added to 250-mL milk at a refrigerated temperature of about 40° F. to about 32° F. (about 4° C. to about 0° C.). The foam disintegrated quickly to form an orange-tinged, orange-flavored beverage.

Most commercially-available chocolate flavor is fat-soluble and, therefore, is difficult to incorporate in foam applications, as fat-soluble components may collapse the foam. Accordingly, water-soluble natural chocolate flavors were used for Examples 5-8 and which did not collapse the foam.

Example 5

Example 5 was made by combining 70 g of aquafaba (61% by weight), 40 g of sucrose (35% by weight), 1.2 g sucralose (1% by weight), coloring agent, and 2.9 g natural chocolate flavoring (3% by weight). The aquafaba contained about 90% water and about 2% protein, by weight. The combined ingredients were whipped to form a foam. The foam was piped onto a tray and baked to form a stable, baked solid foam.

The solid foam was added to 250-mL milk at a refrigerated temperature of about 40° F. to about 32° F. (about 4° C. to about 0° C.). The foam disintegrated quickly to form a brownish, chocolate-flavored beverage.

Example 6

Example 6 was made by combining 70 g of aquafaba (62% by weight), 40 g of sucrose (36% by weight), 1.0 g Tasteva® (Tate & Lyle LLC, London, UK) stevia sweetener (0.9% by weight), caramel coloring agent 1 g (0.9% by weight), and 0.2 g liquid chocolate flavoring (0.2% by weight). The aquafaba contained about 90% water and about 2% protein, by weight. The combined ingredients were whipped to form a foam. The foam was piped onto a tray and baked to form a stable, baked solid foam.

The solid foam was added to a 250-mL beverage and disintegrated in both milk and water in less than 90 seconds to form a brownish, slightly chocolate-flavored beverage. The milk and the water were at a refrigerated temperature of about 40° F. to about 32° F. (about 4° C. to about 0° C.

Example 7

Example 7 was made by combining 70 g of aquafaba (62% by weight), 40 g of sucrose (36% by weight), 1.0 g Tasteva® (Tate & Lyle LLC, London, UK) stevia sweetener (0.9% by weight), caramel coloring agent 1 g (0.9% by weight), and 0.2 g chocolate cake flavoring (0.2% by weight). The aquafaba contained about 90% water and about 2% protein, by weight. The combined ingredients were whipped to form a foam. The foam was piped onto a tray and baked to form a stable, baked solid foam.

The solid foam was added to a 250-mL beverage and disintegrated in milk in less than 60 seconds and water in less than 90 seconds to form a brownish, chocolate-flavored beverage. The milk and the water were at a refrigerated temperature of about 40° F. to about 32° F. (about 4° C. to about 0° C.).

Example 8

Example 8 was made by combining 70 g of aquafaba (62% by weight), 40 g of sucrose (36% by weight), 1.0 g Tasteva® (Tate & Lyle LLC, London, UK) stevia sweetener (0.9% by weight), caramel coloring agent 1 g (0.9% by weight), and 0.6 g chocolate cake flavoring (0.5% by weight). The aquafaba contained about 90% water and about 2% protein, by weight. The combined ingredients were whipped to form a foam. The foam was piped onto a tray and baked to form a stable, baked solid foam.

The solid foam was added to a 250-mL beverage and disintegrated in water at a refrigerated temperature of about 40° F. to about 32° F. (about 4° C. to about 0° C.) in less than 90 seconds to form a brownish, chocolate-flavored beverage.

In Examples 9-11, all of the ingredients were mixed together and cooked to about 295° F. (146° C.) on a stovetop. No acid was included in the ingredients, but acid may be added to provide a tart flavor and inhibit sugar crystallization, which decreases disintegration time. A drop roller was then used to form ball-shaped pieces of a desired size for hard candy. The ball-shaped hard candy pieces were then placed an oven for vacuum expansion. The candy was heated and expanded in the oven set at 155° F. (68.3° C.) for about 10 minutes on pans lined with crinkled aluminum foil. The edible solid foams of Examples 9-11 had a density in the range of 0.23 to 0.36 g/cm$^3$ (0.13 to 0.21 oz/in$^3$).

Example 9

Example 9 was made by combining 541.46 g (54.15% by weight) sucrose, 332.7 g (33.3% by weight) corn syrup, 105.39 (10.5% by weight) water, 5.37 g (0.54% by weight) brown food coloring, 5.00 g (0.50% by weight) liquid chocolate flavoring, and 10.07 g (1.01% by weight) stevia.

Example 9 was an amorphous solid that disintegrated in less than one minute in milk at a refrigerated temperature of about 40° F. to about 32° F. (about 4° C. to about 0° C.).

Example 10

Example 10 was made by combining 533.04 g (53.27%) sucrose, 332.7 g (33.2%) corn syrup, 105.39 (10.5% by weight) water, 5.37 g (0.54%) brown food coloring, 13.42 g (0.50%) powder chocolate flavoring, 10.07 g (1.01%) stevia, and 0.7 g (0.07%) vanilla.

Example 10 was an amorphous solid that disintegrated in less than one minute in milk at a refrigerated temperature of about 40° F. to about 32° F. (about 4° C. to about 0° C.).

Example 11

Example 11 was made by combining 540.82 g (54.08%) sucrose, 332.7 g (33.3%) corn syrup, 105.39 (10.5% by weight) water, 5.37 g (0.54%) brown food coloring, 10.0 g (1.0%) liquid chocolate flavoring, 5.01 g (0.50%) stevia, and 0.7 g (0.07%) vanilla.

Example 11 was an amorphous solid that disintegrated in less than one minute in milk at a refrigerated temperature of about 40° F. to about 32° F. (about 4° C. to about 0° C.).

Example 12

Equal amounts by weight of sucrose and high maltose corn syrup were mixed with water and cooked at about 295° F. (146° C.), followed by cooling on a tempering table set at 160° F. (71° C.), followed by an optional pulling with an automated puller, followed by drop rolling, followed by vacuum expansion. No acid was included in the ingredients. The candy was heated and vacuum expanded in the vacuum oven set at 155° F. (68° C.) for about 10 minutes on pans lined with crinkled aluminum foil. To determine the effect of open kettle cooking on the disintegration time of the vacuum-expanded product, cooking occurred either under vacuum or in an open kettle. No pulling was used with vacuum-cooked samples. To determine the effect of pulling on the disintegration time of the vacuum-expanded product, open kettle cooked samples were either not pulled at all, pulled for 15 seconds, or pulled for 45 seconds.

Average values of certain properties of the resulting samples are shown below in Table 1. For each sample type, the values shown in Table 1 reflect an average of ten samples. Vacuum cooked samples with no vacuum expansion (VC), open kettle cooked samples with no pulling and no vacuum expansion (OKC), open kettle cooked samples with 15 seconds of pulling and no vacuum expansion (OKC15), and open kettle cooked samples with 45 seconds of pulling and no vacuum expansion (OKC45) were tested for density and diameter. Vacuum cooked and vacuum expanded samples (VCE), open kettle cooked and vacuum expanded samples with no pulling (OKCE), open kettle cooked and vacuum expanded samples with 15 seconds of pulling (OKC15), and open kettle cooked and vacuum expanded samples with 45 seconds of pulling (OKC45) were tested for density, diameter, disintegration time (DT) in water at room temperature of about 68° F. to about 77° F. (about 20° C. to about 25° C.), and disintegration time in milk at room temperature of about 68° F. to about 77° F. (about 20° C. to about 25° C.). The specific density was calculated as the ratio of the density of the vacuum-expanded sample to the density of the sample prior to vacuum expansion. The expansion ratio was calculated as the ratio of the volume of the vacuum-expanded sample to the volume of the sample prior to vacuum expansion.

TABLE 1

Properties of Test Samples

| Sample | Density (g/mL) | Specific density | Expansion ratio (V/V) | Diameter (mm) | DT in water (s) | DT in milk (s) |
|---|---|---|---|---|---|---|
| VC | 1.68 | | | 13.44 | | |
| VCE | 1.60 | 0.95 | 1.02 | 13.63 | 1380 | 3300 |
| OKC | 1.65 | | | 13.17 | | |
| OKCE | 0.42 | 0.25 | 3.71 | 24.47 | 56.6 | 48.1 |
| OKC15 | 1.61 | | | 13.31 | | |
| OKC15E | 0.26 | 0.16 | 5.54 | 23.19 | 3.9 | 5.7 |
| OKC45 | 1.35 | | | 13.21 | | |
| OKC45E | 0.22 | 0.16 | 4.62 | 21.93 | 18.0 | 94.6 |

Vacuum cooking produced virtually no air incorporation into the sample, as indicated by the high density of the sample (VC) prior to vacuum expansion and the very little amount of expansion by vacuum expansion (VCE). Open kettle cooking produced a lower density of the sample prior to vacuum expansion (OKC), which further reduced the density with increased pulling times (OKC15, OKC45). The vacuum-cooked vacuum-expanded samples (VCE) had much longer disintegration times relative to the open kettle-cooked vacuum-expanded samples (OKCE, OKC15E, OKC45E). Fifteen seconds of pull time (OKC15E) unexpectedly significantly decreased the disintegration time of the sample in both water and milk relative to no pulling (OKCE) and to 45 seconds of pulling (OKC45E). Fifteen seconds of pulling provided disintegration times of 3.9 seconds in water and 5.7 seconds in milk, compared to 56.6 seconds in water and 48.1 seconds in milk with no pulling and 18.0 seconds in water and 94.6 seconds in milk with 45 seconds of pulling.

Without being bound by theory, it is believed that both the amount of incorporated air and the average pore size of the incorporated air in a solid foam product affect the disintegration rate of the solid foam product. It is also believed that as the pulling time is increased, although the amount of incorporated air increases, promoting faster disintegration, the size of the incorporated air bubbles decreases, reducing the rate at which the aqueous liquid enters the pores and leading to slower disintegration. Furthermore, it is believed that optimal channels of an optimal dimension were formed at an intermediate pull time (between 0 and 45 seconds in Example 12) due to partial air bubble coalescence, which enhanced the uptake of the aqueous medium into the matrix through capillary action.

Example 13

Twelve formulations using various syrups or cocoa powders were used to form a vacuum expanded hard candy beverage enhancer. The ingredients and amounts are listed in Table 2 for each of eight syrup formulations and four cocoa formulations. The syrup ingredients were high maltose (HM) corn syrup (S1), tapioca syrup (S2), brown rice syrup (S3), agave syrup (S4), inverted sugar syrup (S5), honey (S6), coconut sugar (S7), and date sugar (S8). The cocoa ingredients were agglomerate cocoa-powder (C1), lecithinated cocoa (C2), natural cocoa (C3), and alkalized cocoa powder (C4).

For each formulation, all of the ingredients in Table 3 were mixed and cooked to about 295° F. (about 146° C.). A drop roller was used to created spherical pieces that were then vacuum-expanded in an oven. For the vacuum expansion, the candy was placed on pans lined with crumpled aluminum foil and was heated and expanded for about 10 minutes at an oven temperature of about 155° F. (about 68° C.).

TABLE 2

Syrup/Cocoa Hard Candy Beverage Enhancer Ingredients (wt %)

| Formulation | S1-S6 | S7 | S8 | C1-C4 |
|---|---|---|---|---|
| Syrup or Cocoa | 33.7 | 51.4 | 46.2 | 10.0 |
| Sucrose | 55.1 | 3.6 | 3.1 | 49.5 |
| High maltose Corn Syrup | — | 33.8 | 30.8 | 30.6 |
| Water | 10.7 | 10.7 | 19.4 | 9.6 |
| Stevia | 0.5 | 0.5 | 0.5 | 0.5 |

Out of the syrups tested, HM corn syrup (S1), tapioca syrup (S2) and brown rice syrup (S3) produced the best results and cooked and formed a vacuum expanded hard candy with a fast disintegration rate. The agave (S4), inverted sugar (S5), and honey (S6) formulation experienced slight deflation during expansion. The date sugar (S8) was unsuccessful and resisted dissolving while being cooked, instead forming a grainy mass in the pot. All cocoa powder (C1-C4) formulations were successful at delivering a good chocolate taste and pigment to milk.

Example 14

Six formulations including alkalized cocoa powder were tested in a vacuum expanded hard candy beverage enhancer. All formulations had the same amounts of sucrose, high-maltose (HM) corn syrup, and stevia, as shown in Table 3. The amounts of water and alkalized cocoa powder or chocolate flavoring varied. For each formulation, all of the ingredients in Table 3 except for the stevia were mixed and cooked on a stovetop to about 295° F. (about 146° C.). The stevia was then added while gradually decreasing the temperature. The resulting hard candy was pulled for 15 seconds; Formulas A-E were mechanically pulled and Formula F was manually pulled. A drop roller was used to created spherical pieces of the hard candy. The spherical pieces were then vacuum-expanded in an oven. For the vacuum expansion, the candy was placed on pans lined with crumpled aluminum foil and was heated and expanded for about 10 minutes at an oven temperature of about 155° F. (about 68° C.). The disintegration times in Table 3 are for disintegration in milk at a refrigerated temperature of about 40° F. to about 32° F. (about 4° C. to about 0° C.).

TABLE 3

Hard Candy Beverage Enhancer Ingredients (wt %) and Disintegration Time (sec)

| Formulation | A | B | C | D | E | F |
|---|---|---|---|---|---|---|
| Sucrose | 49.4 | 49.4 | 49.4 | 49.4 | 49.4 | 49.4 |
| HM Corn Syrup | 30.2 | 30.2 | 30.2 | 30.2 | 30.2 | 30.2 |
| Alkalized Cocoa Powder | 5.0 | 10.0 | 15.0 | 10.0 | 10.0 | 10.0 |
| Chocolate flavoring | 0 | 0 | 0 | 1.0 | 3.0 | 5.0 |
| Water | 15.0 | 10.0 | 5.0 | 9.0 | 7.0 | 5.0 |
| Stevia | 0.4 | 0.4 | 0.4 | 0.4 | 0.4 | 0.4 |
| Disintegration Time | 26 | 30 | >60 | >60 | 30 | 25 |

While the foregoing specification illustrates and describes exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A food product comprising an air-stable edible solid foam that disintegrates in the presence of an aqueous liquid, the air-stable edible solid foam comprising, on a dry weight basis:
   about 13.3 to about 14.3 wt % of at least one proteinaceous whipping agent derived from a plant source comprising an aqueous protein extract of a legume; and
   about 78.6 to about 83.4 wt % of at least one sweetener selected from the group consisting of sucrose, a high intensity sweetener, and a combination thereof.

2. The food product of claim 1 further comprising at least one coloring agent, at least one flavoring agent, or both.

3. The food product of claim 1, wherein the aqueous protein extract of a legume is extracted from a legume selected from the group consisting of alfalfa, asparagus beans, asparagus peas, baby lima beans, black beans, black-eyed peas, black turtle beans, Boston beans, Boston navy beans, broad beans, Cannellini beans, chili beans, cranberry beans, dwarf beans, Egyptian beans, Egyptian white broad beans, English beans, fava beans, field peas, French green beans, great northern beans, green beans, green and yellow peas, kidney beans, licorice, lima beans, Madagascar beans, Mexican black beans, Mexican red beans, molasses face beans, mung beans, mung peas, mungo beans, navy beans, pea beans, peanuts, Peruvian beans, pinto beans, red beans, red clovers, red eye beans, red kidney beans, rice beans, runner beans, scarlet runner beans, small red beans, snow peas, southern peas, sugar snap peas, soybeans, wax beans, white clovers, white kidney beans, and white pea beans.

4. The food product of claim 3, wherein the aqueous protein extract comprises aquafaba.

5. The food product of claim 4, wherein the aquafaba comprises proteins having a molecular weight in the range of 9 kDa to 74 kDa.

6. The food product of claim 1, wherein the air-stable edible solid foam consists of the at least one proteinaceous whipping agent derived from a plant source and the at least one sweetener.

7. The food product of claim 1, wherein the air-stable edible solid foam has a predetermined disintegration time of less than 60 seconds in a target beverage.

8. The food product of claim 7, wherein the target beverage has a temperature of 10° C. or less.

9. The food product of claim 1, further comprising cocoa.

10. The food product of claim 9, further comprising chocolate flavoring.

11. The food product of claim 1, wherein the food product is free of a modified protein and free of an artificial whipping agent.

12. The food product of claim 1, wherein the high intensity sweetener is selected from the group consisting of sucralose, stevia, aspartame, saccharin, acesulfame potassium, and a combination thereof.

13. The food product of claim 1, wherein the air-stable edible solid foam further comprises an oral agent selected from the group consisting of a breath freshener, a dental treatment, an anesthetic, an antihistamine, and an analgesic.

14. The food product of claim 1, wherein the air-stable edible solid foam has at least one dimension greater than 1 cm.

15. An air-stable edible solid foam product that disintegrates in the presence of an aqueous liquid, wherein the air-stable edible solid foam product is manufactured by a method comprising:
   whipping a foamable mixture comprising, on a dry weight basis, about 13.3 to about 14.3 wt % of at least one proteinaceous whipping agent derived from a plant source comprising an aqueous protein extract of a legume, about 78.6 to about 83.4 wt % of at least one sweetener selected from the group consisting of sucrose, a high intensity sweetener, and a combination thereof, and at least one flavoring agent to form a foamed mixture; and baking the foamed mixture to form the air-stable edible solid foam product.

16. A solid foam beverage enhancer comprising an air-stable edible solid foam that disintegrates in the presence of an aqueous liquid, the air-stable edible solid foam comprising, on a dry weight basis:
- about 13.3 to about 14.3 wt % of at least one proteinaceous whipping agent derived from a plant source comprising an aqueous protein extract of a legume;
- about 78.6 to about 83.4 wt % of at least one sweetener;
- about 1.9 to about 2.5 wt % of a coloring agent; and
- about 0.4 to about 5.5 wt % of a flavoring agent.

17. The solid foam beverage enhancer of claim 16, wherein the aqueous protein extract of a legume comprises aquafaba and the at least one sweetener comprises sucrose and a high intensity sweetener.

18. The solid foam beverage enhancer of claim 17, wherein the air-stable edible solid foam comprises about 76.3 to about 81.3 wt % sucrose and about 2.0 to about 2.3 wt % of the high intensity sweetener on a dry weight basis.

* * * * *